Figure 1:
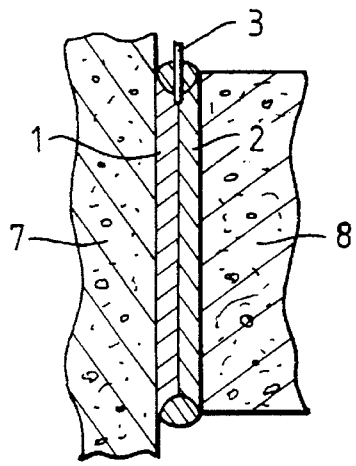

United States Patent

Knutsen

Patent Number: 5,595,405
Date of Patent: Jan. 21, 1997

[54] DIAPHRAGM POWER JACK

[75] Inventor: Hans Knutsen, Akrehamn, Norway

[73] Assignee: OBS Technology A/S, Husøysund, Norway

[21] Appl. No.: 318,693

[22] PCT Filed: Feb. 11, 1993

[86] PCT No.: PCT/NO93/00025

§ 371 Date: Oct. 11, 1994

§ 102(e) Date: Oct. 11, 1994

[87] PCT Pub. No.: WO93/21099

PCT Pub. Date: Oct. 28, 1993

[30] Foreign Application Priority Data

Apr. 10, 1992 [NO] Norway .................................. 921431
May 21, 1992 [NO] Norway .................................. 922010

[51] Int. Cl.⁶ .................................................. F16L 17/00
[52] U.S. Cl. .................... 285/96; 285/382.7; 285/417; 285/97
[58] Field of Search ........................ 125/23.01; 299/16, 299/20, 21; 285/96, 97, 382.2, 259, 382-7, 417

[56] References Cited

U.S. PATENT DOCUMENTS

| 2,083,842 | 6/1937 | Henning | 285/96 X |
| 2,147,356 | 2/1939 | Scholtes | 285/259 X |
| 3,097,866 | 7/1963 | Ivensen | 285/96 X |
| 3,420,554 | 1/1969 | Straub . | |
| 3,822,861 | 7/1974 | Scott . | |
| 4,026,584 | 5/1977 | Lowe . | |
| 4,469,357 | 9/1984 | Martin | 285/382.7 X |
| 4,676,531 | 6/1987 | Martin | 285/96 |
| 5,219,186 | 6/1993 | Hosseinian et al. | 285/382.2 X |

FOREIGN PATENT DOCUMENTS

| 0166505 | 4/1991 | Norway . |
| 0410441 | 10/1979 | Sweden . |

Primary Examiner—Dave W. Arola
Attorney, Agent, or Firm—Woodard, Emhardt, Naughton, Moriarty & McNett

[57] ABSTRACT

Method for increasing the distance between two faces, inserting into a space between the two faces a diaphragm power jack, the shape of which being adapted to the shape of the space, the diaphragm power jack comprising two abutting sheets being sealingly bonded along the entire circumference, a pipe penetrating the bonded, injecting a pressurized fluid through the pipe to the interface between the two sheets thereby forcing the sheets apart whereby substantially all the energy from the pressurized fluid being converted to forces perpendicularly to the sheets.

4 Claims, 3 Drawing Sheets 5,595,405

DIAPHRAGM POWER JACK

The Present invention is related to a diaphragm power jack and a method of utilizing same.

In numerous situations within many fields efforts have been made to increase a distance between two parts in a quick and efficient way. Such a situation occurs when two flanges which have been clamped together, are to be loosened. In such case one of the flanges should be moved away from the other or even both flanges should be axially displaced.

In many other cases the aim is to remove or displace only one of the parts between which a gap exists. This is the case by partitioning a subject into smaller parts which is the case in stone quarries, when removing a concrete outer layer from a pipe, etc.

The need for a small and effective tool to provide a very strong force in a selected direction, substantially without loss of energy in other directions will increase productivity and the accuracy of the performance substantially.

In connection with repairs of pipelines of the above mentioned type a considerable amount of time is used for removing the outer concrete layer to give accessibility to the pipe itself for repairs maintenance or modifications. It is in fact known to cut tracks in the concrete around the exterior circumference and likewise longitudinal cuts whereby hydraulic tools are used to press the sections apart in a tangential direction, resulting in braking the concrete out in small pieces.

The forces from the tool may be released between parallel flat or cylindric sheets. The forces will be directed perpendicularly to the plane of the flat sheets or perpendicularly or radially to the cylindric plane of cylindric sheets. In the latter case the direction is radially inwardly from a stronger outer cylinder or radially outwardly from a stronger inner cylinder, of which the first case will be a clamping operation.

Repair of pipelines on difficult accessible places, such as at the sea bed, is time consuming and in many ways very difficult if repair work is to be made by welding. A ruptured pipeline usually is cut and a new portion inserted which portion thereafter has to be welded to the pipeline at both ends.

The method and tool according to the present invention very efficiently solve the above mentioned problem operations in the above mentioned application fields as well as others by concentrating the force input almost completely to the desired force direction, perpendicularly to the sheets, if plane or cylindric, the direction being linear or radial.

The above mentioned objectives are achieved with the method and tool according to the present invention as defined with the features stated in the patent claims.

In the drawing

Figure 2:
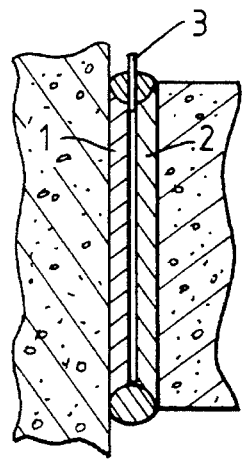
Figure 3:
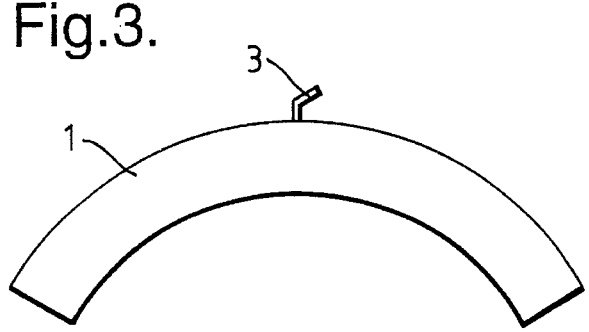
Figure 4:
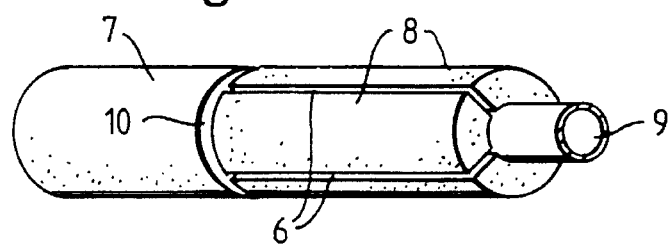
Figure 5:
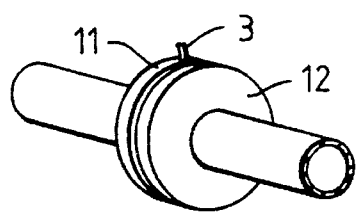
Figure 6:
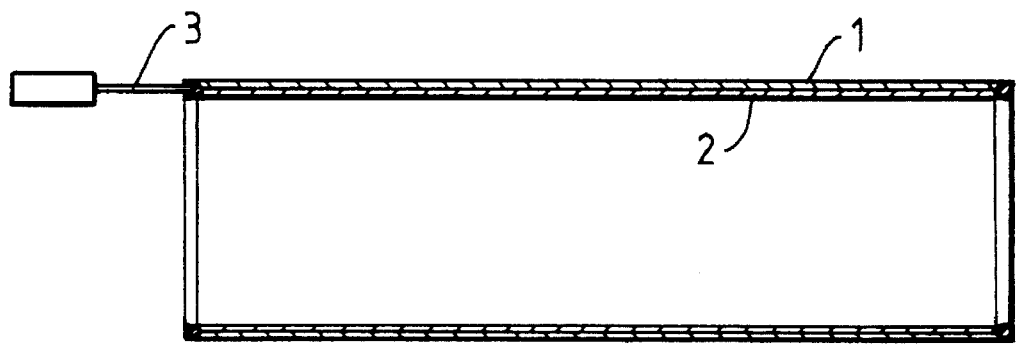
Figure 7:
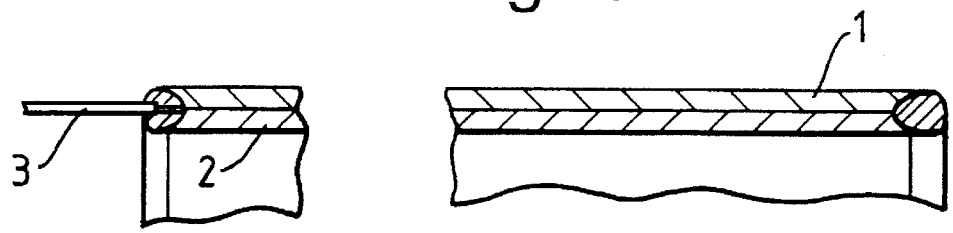
Figure 8:
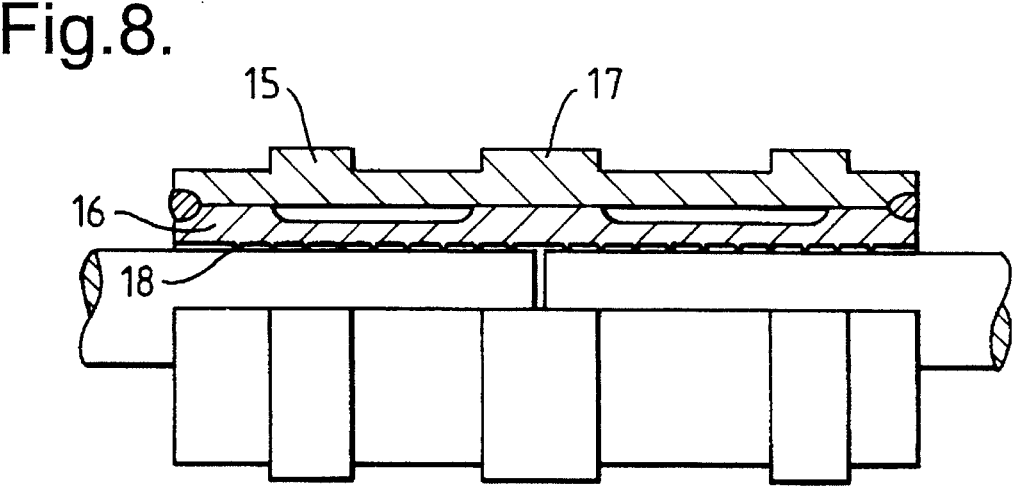
Figure 9:
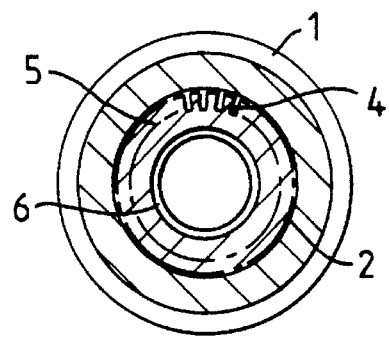
Figure 10:
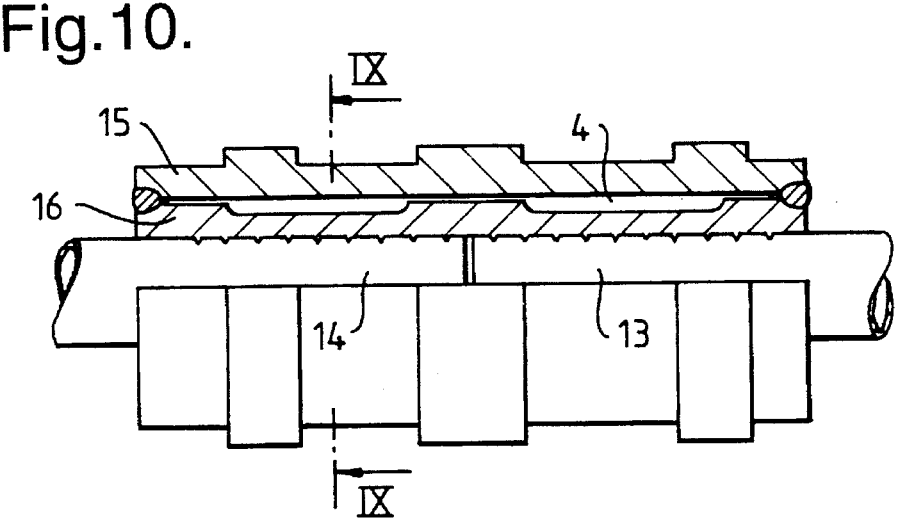
Figure 11:
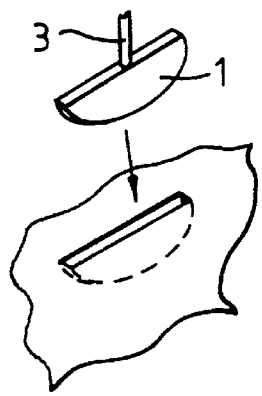
Figure 12:
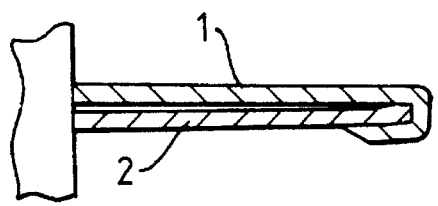

FIG. 1 in a cross sectional way schematically discloses the tool according to the present invention before use and FIG. 2 discloses the same tool after use, in an expanded position, FIG. 3 discloses the tool in FIGS. 1 and 2 in a side view, FIG. 4 discloses schematically the method for cutting a section of a concrete layer around a pipe line out by means of the tool according to the present invention, FIG. 5 discloses the principle for removing flanges from each other by means of the present invention, FIG. 6 discloses schematically in an axial section the tool according to the present invention in the shape of a cylinder for provision of radial forces, FIG. 7 discloses an enlargement of a detail from FIG. 6, FIG. 8 discloses a longitudinal section through a tool for connection of two pipes before the operation, FIG. 9 discloses a cross section from FIG. 10, FIG. 10 discloses a longitudinal section corresponding with FIG. 8, however after the clamping operation, FIG. 11 discloses rock breaking by means of the diaphragm power jack according to the invention and FIG. 12 discloses an alternative method for manufacturing the plane power jack.

FIG. 4 discloses one application field for the present invention, namely part of a pipe line 9 embedded in a concrete layer such as an oil pipe arranged on a seabed. In cases where repairs, maintenance or inspection must be performed on the pipeline, the need to remove the concrete layer along a portion of the pipe arises.

According to the present invention a slot 10 is worked out in the concrete layer, along the entire circumference of the same and radially inwardly to the pipe 9. The concrete 7 is further cut into sections 8 with longitudinal slots. In the circumferential slot 10 a power jack according to the present invention is inserted, the power jack thereby having an arcuate shape as disclosed in FIG. 3, covering exactly the circumferential length of the section 8 selected by the longitudinal slots. The diaphragm power jack according to the invention principally comprises two sheets 1, 2 being sealingly connected to each other along the circumference. The two sheets 1 and 2 have a shape corresponding to the surfaces against which the sheets 1 and 2 are to be pressed, such as the shape of FIG. 3 to be used in connection with the cylinder shape disclosed in FIG. 4. The thickness of the sheets 1 and 2 correspond substantially width of the slot 10.

Upon inserting of the diaphragm power jack into the slot 10, hydraulic fluid is forced in between the sheets 1 and 2 through a corresponding pipe 3 protruding out from the end. Upon pressurizing, the diaphragm power jack will assume the shape disclosed in FIG. 2 while forcing the section 8 axially from the slot 10, the binding between concrete section 8 and the pipe 9 thereby being ruptured by the shearing forces and the section 8 being removed from the pipe 9 substantially in one part. The section 8 previously being cut by the circumferential slot 10 as well as axial slots 6.

Based on the same principle two flanges 11, 12 as disclosed in FIG. 5 may be pressed away from each other after loosening bolts or other clamping devices, by inserting the diaphragm power jack according to the present invention in the slot between the flanges, pressurizing the innerface between the two sheets 1 and 2 through the pipe 3 thereby to release the flanges 11 and 12 from each other.

The tool according to the present invention provides an excellent possibility to cut rocks from a stone quarry, tear down houses etc. instead of using for example dynamite. By means of an angle grinder a segment shaped groove is made in the rock, concrete etc. A diaphragm power jack having the same shape as the groove thereafter is inserted into the groove, pressurizing the jack will break up the rock or concrete breaks into pieces of desirable seize.

FIG. 6 discloses the principle of the diaphragm power jack according to the present invention, used in the form of a cylinder, the sheets 1 and 2 both being constituted by abutting cylinders sealingly connected at both axial ends and a pipe 3 giving admittance for pressurized fluid to the interface between the two sheets or cylinders, as clearly can be seen from FIG. 7. By inserting the connected sheet cylinders 1 and 2 into a correspondingly shaped space between two cylinder faces, the total force provided by the pressurized fluid may be used to widen the outer cylinder face or shrinking the inner cylinder face, depending on which of both has the strongest resistance.

FIGS. 8–10 disclose one embodiment of the diaphragm power jack according to the present invention as used to sealingly connect two substantially abutting pipes 13 and 14.

The diaphragm power jack according to the present invention for this purpose comprises an inner cylinder 16 and an outer cylinder 15 being sealingly connected at both ends such as by welding and being provided with at least one pipe 3 (not shown in FIGS. 8–10) for the purpose of pressurizing the power jack. The outer cylinder 15 is suitably provided with outer strengthening flanges 17 and the inner cylinder 16 is suitably provided with inwardly protruding acute shaped cams 18 at least along selected portion thereof. The inner cylinder 16 furthermore comprises outer grooves 4 along selected portions in the axial direction, thereby partly weakening the material of the inner cylinder 16, partly creating a space for receipt of redundant material from the inner cylinder 16 during the shrinkage operation.

The fluid used may be water or oil and preferably a plastic material in a liquid form when being injected through the pipe 3 under high pressure, thereafter curing and hardening to maintain or even increase a permanent high pressure from the outer cylinder 15 to the inner cylinder 16 and further to the pipes 13 and 14.

In a further embodiment the diaphragm power jack according to the present invention also may be used to sealingly connect two pipes having different outer diameters, the outer and inner cylinders 15 and 16 thereby being manufactured correspondingly and preferably comprising two separated interface, each having slots 4.

I claim:

1. A device for interconnecting in a sealing manner the end portions of two substantially aligned pipes, comprising outer and inner cylindrical sleeves formed from a metal that are sealingly joined together at their ends to form an intermediate, closed annular space therebetween to which a pressure medium may be supplied, said inner sleeve forming a clamping sleeve that is subjected to shrinking when a pressure medium is supplied to said closed annular space, whereby when said inner sleeve is under a pressure medium influence said inner sleeve is pressed into sealing contact with the abutting end portions of two substantially aligned pipes that are positioned within said inner sleeve;

a plurality of longitudinally extending groove means that are uniformly distributed over the outer surface of said inner sleeve for receiving sleeve material that is brought to flow during shrinking of said inner sleeve under a pressure medium influence, whereby said inner sleeve maintains its circular cross-section as it shrinks; and a plurality of inwardly projecting, peripherally extending ribs that are provided on the inner surface of said inner sleeve to penetrate the outer surface of two substantially aligned pipes positioned within said inner sleeve during the shrinking of said inner sleeve under a pressure medium influence, whereby leakage barriers are formed.

2. A device according to claim 1, wherein both said inner and outer sleeves are made from steel.

3. A device according to claim 1, wherein the pressure medium supplied is a curable medium that, after curing, maintains pressure on said inner sleeve.

4. A device according to claim 2, wherein the pressure medium supplied is a curable medium that, after curing, maintains pressure on said inner sleeve.

* * * * *